US009432395B2

(12) United States Patent
Glover et al.

(10) Patent No.: US 9,432,395 B2
(45) Date of Patent: Aug. 30, 2016

(54) APPLICATION SPAM DETECTOR

(71) Applicant: Quixey, Inc., Mountain View, CA (US)

(72) Inventors: Eric J. Glover, Palo Alto, CA (US); Nachum Plonka, Palo Alto, CA (US)

(73) Assignee: Quixey, Inc., Mountain View, CA (US)

( * ) Notice: Subject to any disclaimer, the term of this patent is extended or adjusted under 35 U.S.C. 154(b) by 85 days.

(21) Appl. No.: 14/263,798

(22) Filed: Apr. 28, 2014

(65) Prior Publication Data

US 2015/0312271 A1 Oct. 29, 2015

(51) Int. Cl.
*G06F 17/30* (2006.01)
*H04L 29/06* (2006.01)
*H04L 29/08* (2006.01)

(52) U.S. Cl.
CPC ..... *H04L 63/1441* (2013.01); *G06F 17/30864* (2013.01); *H04L 63/145* (2013.01); *H04L 67/02* (2013.01); *H04L 67/10* (2013.01)

(58) Field of Classification Search
CPC ... H04L 63/1441; H04L 67/02; H04L 67/10; G06F 17/30; G06F 17/864
USPC .......................................................... 726/23
See application file for complete search history.

(56) References Cited

U.S. PATENT DOCUMENTS

| 7,379,944 | B2 * | 5/2008 | Adler | G06F 17/30259 |
| | | | | 707/696 |
| 8,572,073 | B1 | 10/2013 | Kacholia et al. | |
| 8,630,497 | B2 * | 1/2014 | Badawy | 348/143 |
| 8,732,582 | B2 * | 5/2014 | Akaike | G11B 27/105 |
| | | | | 715/730 |
| 8,797,560 | B2 * | 8/2014 | Mori | G06T 11/60 |
| | | | | 358/1.13 |
| 9,213,579 | B2 * | 12/2015 | Allam | G06F 9/5066 |
| 2004/0098224 | A1 * | 5/2004 | Takahashi | G01S 7/4026 |
| | | | | 702/181 |
| 2004/0098724 | A1 * | 5/2004 | Demsey | G06F 12/0253 |
| | | | | 718/104 |
| 2004/0243555 | A1 * | 12/2004 | Bolsius | G06F 17/30471 |
| 2008/0201373 | A1 * | 8/2008 | Ahn | G06Q 10/10 |
| 2009/0089279 | A1 | 4/2009 | Jeong et al. | |
| 2009/0182755 | A1 * | 7/2009 | Adair | G06F 17/30598 |
| 2009/0240644 | A1 * | 9/2009 | Boettcher | H04L 41/142 |
| | | | | 706/47 |

(Continued)

OTHER PUBLICATIONS

Google's cracking down: removes 60,000 crapplications from the Google Play Store: <http://phandroid.com/2013/04/09/google-play-store-spring-cleaning/>, accessed on Aug. 22, 2013.

(Continued)

*Primary Examiner* — Harunur Rashid
*Assistant Examiner* — Sakinah Taylor
(74) *Attorney, Agent, or Firm* — Harness, Dickey & Pierce, P.L.C.

(57) ABSTRACT

A method for performing an application search. The method includes receiving a search query from a remote device and determining a consideration set of applications based on the search query. The consideration set indicates one or more applications corresponding to the search query. For each application indicated in the consideration set, the method includes determining whether the application is a potential spam application based on one or more developer features indicating features associated with a developer of the application. When the application is determined to be a potential spam application, the method includes applying a penalty to the application. The method further includes generating search results based on the consideration set and any penalties applied to the one or more application indicated in the consideration set and providing the search results. The search results indicate one or more of the applications indicated in the consideration set.

16 Claims, 5 Drawing Sheets

(56) References Cited

U.S. PATENT DOCUMENTS

| | | |
|---|---|---|
| 2010/0100564 A1 | 4/2010 | Brewer et al. |
| 2010/0302564 A1* | 12/2010 | Ozawa ............... G06K 15/1849 358/1.9 |
| 2011/0208822 A1* | 8/2011 | Rathod ................. G06Q 30/02 709/206 |
| 2012/0203765 A1 | 8/2012 | Ackerman et al. |
| 2013/0050106 A1* | 2/2013 | Chung ................. H04M 1/673 345/173 |
| 2013/0268889 A1* | 10/2013 | Barak .................... G06F 3/048 715/825 |
| 2013/0290318 A1 | 10/2013 | Shapira et al. |
| 2013/0290319 A1 | 10/2013 | Glover et al. |
| 2013/0290321 A1 | 10/2013 | Shapira et al. |
| 2013/0290322 A1 | 10/2013 | Prosnitz et al. |
| 2013/0290344 A1 | 10/2013 | Glover et al. |
| 2014/0006409 A1 | 1/2014 | Prosnitz et al. |
| 2014/0082182 A1 | 3/2014 | Doan |

OTHER PUBLICATIONS

Penguin 5, With the Penguin 2.1 Spam-Filtering Algorithm, Is Now Live: <http://searchengineland.com/penguin-2-1-and-5-live-173632>, accessed on Apr. 18, 2014.

Google Play Developer Program Policies: <http://play.google.com/about/developer-content-policy.html>, accessed on Apr. 5, 2014.

Google Algorithim Change History: <http://moz.com/google-algorithm-change>, accessed on Apr. 27, 2014.

International Search Report and Written Opinion for related WO Application No. PCT/US2015/027751 dated Jul. 30, 2015.

* cited by examiner

1

APPLICATION SPAM DETECTOR

TECHNICAL FIELD

This disclosure relates to an application spam detector that detects and penalizes potential spam applications in an application search.

BACKGROUND

As users are migrating to an app-centric world the demand for applications has increased, as has the supply of applications. In an app-centric world, users tend to be more inclined to use an application to perform a particular task (e.g., search for a movie time, make a dinner reservation, or play a game) instead of visiting a website that hosts a web application. As the transition to an app-centric world continues, the ability to search for applications or functionality has become more important. Application search engines can search for applications to find applications for users and/or for results within applications to enhance the user experience by leveraging the functionality within applications indicated by the search results.

SUMMARY

One aspect of the disclosure provides a method for performing an application search. The method includes receiving, by a processing device, a search query from a remote device and determining, by the processing device, a consideration set of applications based on the search query. The consideration set indicates one or more applications corresponding to the search query. For each application indicated in the consideration set, the method includes determining, by the processing device, whether the application is a potential spam application based on one or more developer features indicating features associated with a developer of the application. When the application is determined to be a potential spam application, the method includes applying a penalty to the application. The method further includes generating, by the processing device, search results based on the consideration set and any penalties applied to the one or more application indicated in the consideration set and providing, by the processing device, the search results. The search results indicate one or more of the applications indicated in the consideration set. In some implementations, the developer features include a number of source objects published by the developer and, for each of the source objects, a number of feedback units attributed to the source object.

Implementations of the disclosure may include one or more of the following features. In some implementations, determining whether the application is a potential spam application includes determining whether the number of source objects exceeds a source object threshold. When the number of source objects exceeds the source object threshold, the method further includes determining whether a significant percentage of the source objects have less than a first threshold of feedback units attributed thereto, and whether all of the source objects have less than a second threshold of feedback units attributed thereto. The second threshold is greater than the first threshold. The application is identified as a potential spam application when a significant percentage of the source objects have less than the first threshold of feedback units attributed thereto and all of the source objects have less than the second threshold of feedback units attributed thereto.

In some examples, applying the penalty includes removing the application from the consideration set, such that the consideration set no longer indicates the application. The method may further include determining a score for each application indicated in the consideration set based on the search query and application data of the application. Additionally or alternatively, applying the penalty may include multiplying the result score of the application by a reduction factor. Generating the search results may further include ranking the applications in the consideration set based on the respective result scores of the applications in the consideration set.

In some implementations, applying the penalty includes comparing a title of the potential spam applications with the search query. The method can include applying the penalty to the potential spam application, when the title of the potential spam application does not match the search query. The method can include determining whether another application in the consideration set has a title that matches the title of the potential spam application when the title of the potential spam application does match the search query. The method can include only applying the penalty when the result score of the other application is greater than the result score of the potential spam application. In some examples, providing the search results includes transmitting the search results to the remote device via a network and/feeding the search results to a subsequent search process.

Another aspect of the disclosure provides a search engine for performing an application search. The search engine includes a storage device and a processing device that executes computer readable instructions. When the computer readable instructions are executed by the processing device, the processing device receives a search query from a remote device and determines a consideration set of applications based on the search query. The consideration set indicates one or more applications corresponding to the search query. For each application indicated in the consideration set, the search engine includes determining whether the application is a potential spam application based on one or more developer features indicating features associated with a developer of the application. When the application is determined to be a potential spam application, the search engine includes applying a penalty to the application. The search engine further generates search results based on the consideration set and any penalties applied to the one or more applications indicated in the consideration set and provides the search results. The search results indicate one or more of the applications indicated in the consideration set. In some examples, the developer features include a number of source objects published by the developer and, for each of the source objects, a number of feedback units attributed to the source object.

In some implementations, determining whether the application is a potential spam application includes determining whether the number of source objects exceeds a source object threshold. When the number of source objects exceeds the source object threshold, the search engine can determine whether a significant percentage of the source objects have less than a first threshold of feedback units attributed thereto. The search engine further determines whether all of the source objects have less than a second threshold of feedback units attributed thereto. The second threshold is greater than the first threshold. The application is identified as a potential spam application when a significant percentage of the source objects have less than the first threshold of feedback units attributed thereto and all of the source objects have less than the second threshold of feedback units attributed thereto.

In some examples, the computer-readable instructions further cause the processing device to determine a result score for each application indicated in the consideration set based on the search query and application data of the application. Additionally or alternatively, applying the penalty may include multiplying the result score of the application by a reduction factor. Generating the search results can further include ranking the applications in the consideration set based on the respective result scores of the applications in the consideration set.

In some implementations, applying the penalty includes comparing a title of the potential spam application with the search query. When the title of the potential spam application does not match the search query, the search engine may apply the penalty to the potential spam application. When the title of the potential spam application does match the search query, the search engine may determine whether another application in the consideration set has a title that matches the title of the potential spam application. In some implementations, when another application in the consideration set has a title that matches the title of the potential spam application, the search engine only applies the penalty when the result score of the other application is greater than the result score of the potential spam application. Providing the search results may include transmitting the search results to the remote device via a network and/or feeding the search results to a subsequent search process.

DESCRIPTION OF DRAWINGS

Like reference symbols in the various drawings indicate like elements.

DETAILED DESCRIPTION

Figure 1:
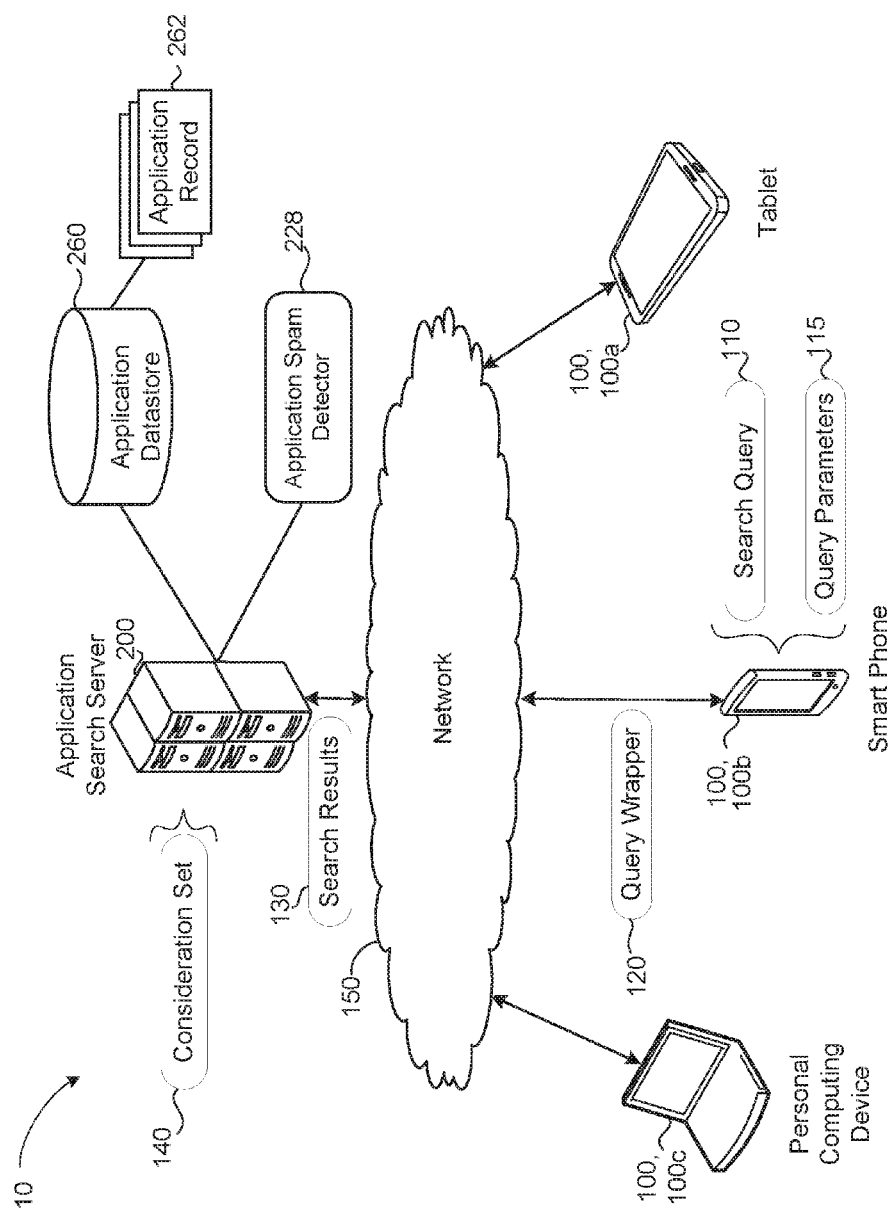
FIG. 1 is a schematic illustrating an example environment of an application search engine.

FIG. 1 illustrates an example environment 10 of an application search engine 200 in communication with a plurality of user devices 100 via a network 150 (e.g., the Internet and/or one or more intranets). The application search engine 200 can include one or more computing devices (e.g., servers) that work individually or in combination to receive a query wrapper 120 containing a search query 110 from a user device 100 and to provide search results 130 corresponding to the search query 110 to the user device 100.

An application can refer to computer readable instructions that cause a user device 100 to perform a task. In some examples, an application may be referred to as an "app" or a "program." Example applications include, but are not limited to, word processing applications, spreadsheet applications, messaging applications, media streaming applications, social networking applications, and games.

Applications can be executed on a variety of different user devices 100. For example, applications can be executed on mobile computing devices, such as smart phones 100b, tablets 100a, and wearable computing devices (e.g., headsets and/or watches). Applications can also be executed on other types of user devices 100 having other form factors, such as laptop computers 100c, desktop computers, or other consumer electronic devices. In some examples, applications may be installed on a user device 100 prior to the purchase of the user device 100. In other examples, a user may download and install applications on the user device 100.

In some implementations, the functionality of an application may be accessed on the user device 100 on which the application is installed. In some examples, the user device on which the application is installed can execute all of an application's functionality. These applications may function without communication with other computing devices. In other examples, an application installed on a computing device may access information from other remote computing devices during operation. For example, a weather application installed on a computing device may access the latest weather information via the remote server and display the accessed weather information to the user through the installed weather application. In still other examples, a web application is an application that may be partially executed by a web browser executing on the user's computing device and partially by a remote server. For example, a web application may be an application that is executed, at least in part, by a web server and accessed by a web browser of the user's computing device. Example web applications may include, but are not limited to, web-based email, online auctions, and online retail sites.

A user device 100 receives a search query 110 from a user via a user interface of the device 100. A search query 110 can include one or more search terms. The user, for example, can provide the search terms by typing text containing the search terms via a touch screen keyboard or can provide speech input containing the search terms via a microphone of the user device 100. In the latter scenario, the user device 100 can perform speech-to-text conversion to identify the search terms. The user device 100 can generate a query wrapper 120 that contains the search query 110. A query wrapper 120 is a data unit that is communicated to the application search server 200 via a network 150. The query wrapper 120 can further include one or more query parameters 115. For example, a query wrapper 120 can include query parameters 115 that indicate one or more of a geolocation of the user device 100, a username associated with the user device 100, and an operating system of the user device 100. In some implementations a search application executing on the user device 100 receives the search query 110 (e.g., via a graphical user interface of the search application or via a search bar), determines zero or more query parameters 115, generates the query wrapper 120 based on the search query 110 and the query parameters 115, and transmits the query wrapper 120 to the application search engine 200. In some implementations, the user device 100 transmits the query wrapper 120 to a partner device (e.g., a server of an organization affiliated in some way with the application search engine 200), and the partner device forwards the query wrapper 120 to the application search engine 200.

The application search engine 200 receives and processes the query wrapper 120. Additionally, the application search engine 200 generates the search results 130 based on the contents of the query wrapper 120. The search results 130 can identify one or more applications that are relevant to the search query 110. The application search engine 200 can perform different types of application searches. Examples of application searches are function based searches and deep searches.

In some implementations, the application search engine 200 performs function based searches. In these searches, the application search engine 200 returns search results 130 that indicate applications that can perform one or more functions implicated by the search query 110 and/or the query parameters 115. For example, in response to a search query 110 containing "organize my finances," the application search engine 200 can provide search results 130 indicating one or more applications that have functionality directed to organizing the finances of a user. In another example, the search query 110 may contain the search terms "games for my five year old." In response to this example search query 110, the application search engine 200 can return search results 130 indicating one or more applications that are age appropriate for younger children.

In some implementations, the application search engine 200 performs deep searching. In these implementations, the application search engine 200 can provide search results 130 that provide one or more links to specific states of one or more applications, whereby the specific states are pertinent to the search query 110 and/or the query parameters 115. The links can be displayed on the user device 100 such that when the link is selected by a user, the user device 100 launches the application to the specific state indicated by the link. For example, in response to a query wrapper 120 containing the search terms "Thai food" and a query parameter 115 indicating the current location of the user device 100, the applications search engine 200 can provide search results 130 including a first link to an entry for a local Thai restaurant in a restaurant review application (e.g., the YELP® application by Yelp, Inc.) and a second link to an entry to make restaurant reservations (e.g., the OPENTABLE® application by OpenTable Inc.) at a local Thai restaurant. In these types of searches, the application search engine 200 can perform a function based search at the front end of the deep search to identify applications that are relevant to the search query 110 and/or the query parameters 115. The search results 130 of the function based search can be further processed to identify the results of the deep search.

The foregoing examples of application searches are provided for explanation only and to provide context. The application search engine 200 may be configured to perform other types of searches as well. For instance, in some applications the search engine 200 may be configured to perform a keyword search, whereby the application search engine 200 searches for applications having titles that match the search terms contained in the search query 110. Additionally or alternatively, the application search engine 200 can perform an entity search, whereby the application search engine 200 identifies applications that are relevant to entity types and/or entity names that are indicated in the search query 110.

A recent development has been for application developers (malicious and otherwise) to develop "spam" applications that provide little or minimal functionality in order to appear in application search results 130 and to entice users to download the spam applications to their respective user devices 100. The motivations for developing and selling spam applications include gaining access to sensitive user information (e.g., the location of the user device 100, the purchasing habits of a user, or financial information of the user) and/or selling the spam applications to the user and to collect the fees associated with the sale.

In order to reduce the amount of spam applications that are indicated in the search results 130, the application search engine 200 can be configured with an application spam detector 228 to identify potential spam applications. In some implementations, the application search engine 200 identifies a consideration set 140 of applications that indicates one or more applications that are relevant to the search query 110 and/or the query parameters 115. The application search engine 200 identifies the applications that are indicated in the search results 130 from the consideration set 140. The application spam detector 228 analyzes developer features of each application indicated in the consideration set 140 to determine whether the application is a potential spam application. When the application spam detector 228 identifies a potential spam application, the application spam detector 228 can apply a penalty to the potential spam application. A penalty can include removing the potential spam application from the search results 130 or by adjusting a result score (discussed in further detail below) of the potential spam application. In some implementations, when the application search engine 200 identifies a potential spam application, the application search engine 200 can identify the potential spam application as such in an application datastore 260. Further, in some implementations, the application search engine 200 can identify applications related to the potential spam applications also as being potential spam applications (e.g., applications published by the same developer).

Figure 2A:
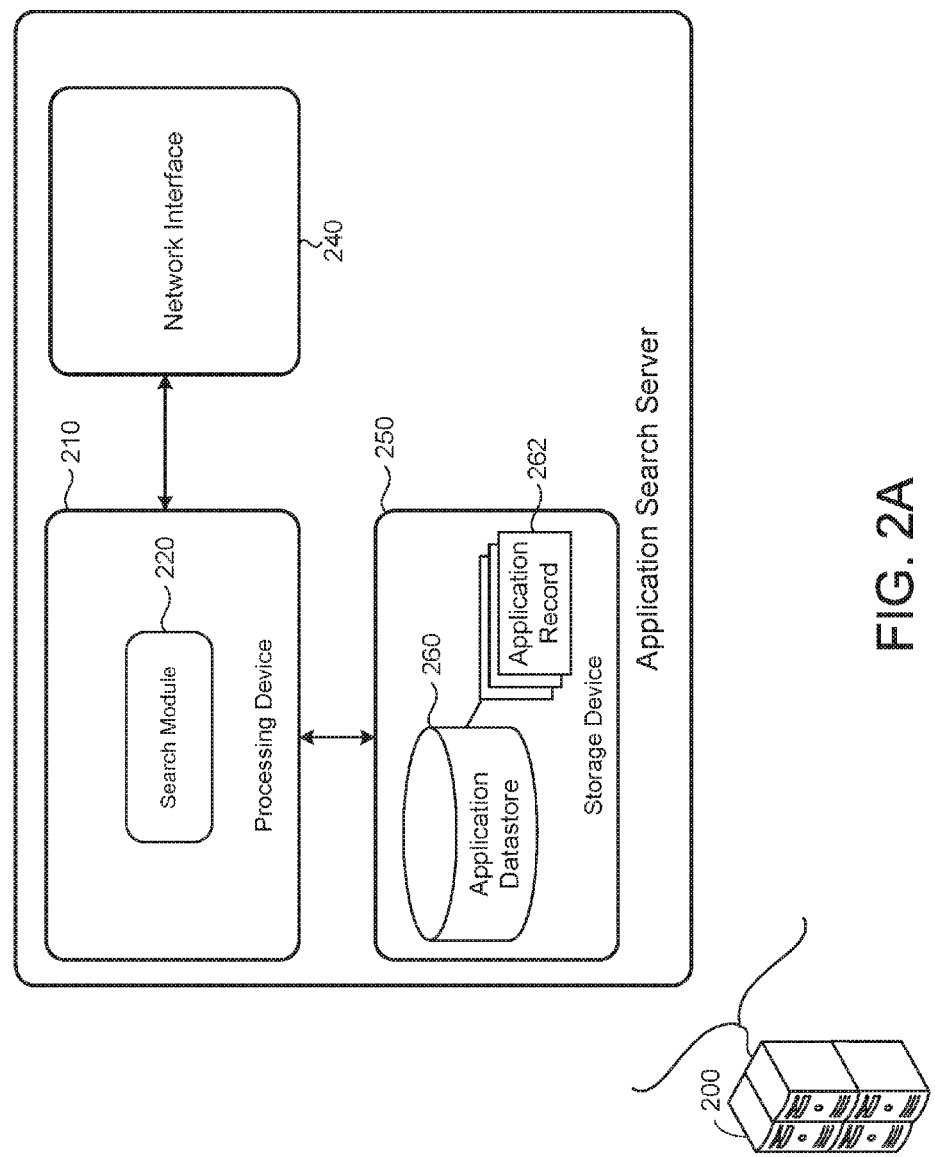
FIGS. 2A and 2B are schematics illustrating example components of an application search engine.
Figure 2B:
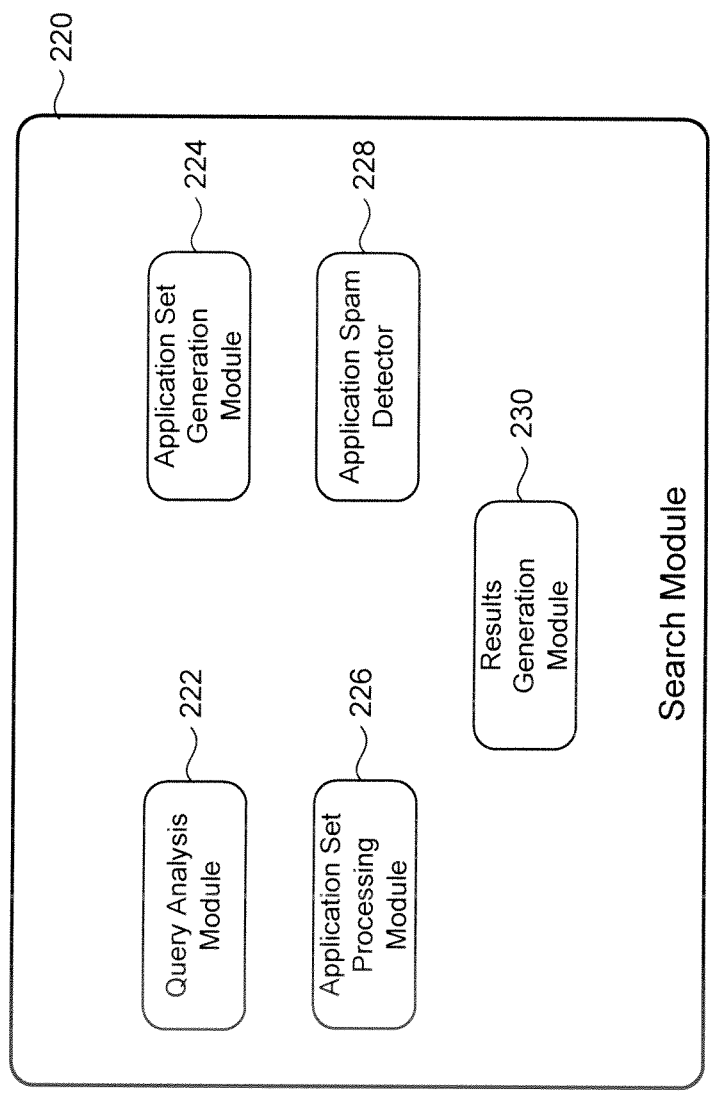

FIGS. 2A and 2B illustrate an example application search engine 200 configured to reduce the amount of spam applications appearing in search results 130. As previously mentioned, the application search engine 200 may be implemented as a single computing device or a plurality of computing devices that operate in a distributed or individual manner. The application search engine 200 can include, but is not limited to a processing device 210, a network interface device 240, and a storage device 250. The application search engine 200 can include one or more other components not explicitly shown in FIG. 2A.

The processing device 210 can include memory (e.g., RAM and/or ROM) that stores computer readable instructions and one or more physical processors that execute the computer readable instructions. In implementations where the processing device 210 includes more than one processor, the processors can operate in an individual or distributed manner. Furthermore, in these implementations the processors can be in the same computing device or can execute in separate computing devices (e.g., rack-mounted servers). The processing device 210 can execute a search module 220.

The network interface device 240 includes one or more devices that can perform wired or wireless (e.g., WiFi or cellular) communication via the network 150. Examples of the network interface device 240 include, but are not limited to, a transceiver configured to perform communications using the IEEE 802.11 wireless standard, an Ethernet port, a wireless transmitter, and a universal serial bus (USB) port.

The storage device 250 can include one or more computer readable storage mediums (e.g., hard disk drives and/or flash memory drives). The storage mediums can be located at the same physical location or device or at different physical locations or devices. The storage device 250 can store an application datastore 260.

The application datastore 260 may include one or more databases, indices (e.g., inverted indices), files, or other data structures storing this data. The application datastore 260 includes application data of different applications. The application data of an application may include keywords associated with the application, reviews associated with the application, the name of the developer of the application, the platform of the application, the price of the application, application statistics (e.g., a number of downloads of the application and/or a number of ratings of the application), a category of the application, and other information. The application data of an application may also include an indicator (e.g., a flag) that indicates whether the application has been determined to be a potential spam application. The application datastore 260 may include metadata for a variety of different applications available on a variety of different operating systems. The search module 220 may retrieve and analyze the application data from the application datastore 260 in order to perform application searches and to provide search results 130.

In some implementations, the application datastore 260 stores the application data in application records 262. Each application record 262 can correspond to an application and may include the application data pertaining to the application. An example application record 262 includes an application name, an application identifier, and other application features. The application record 262 may generally represent the application data stored in the application datastore 260 that is related to an application.

The application name may be the name of the application represented by the data in the application record 262. Example application names may include "FACEBOOK®" by Facebook, Inc., "TWITTER®" by Twitter, Inc., or "MICROSOFT WORD®" by Microsoft Corp. The application identifier (hereinafter "application ID") identifies the application record 262 amongst the other application records 262 included in the application datastore 260. In some implementations, the application ID may uniquely identify the application record 262. The application ID may be a string of alphabetic, numeric, and/or symbolic characters (e.g., punctuation marks) that uniquely identify the application represented by the application record 262. In some implementations, the application ID is the ID assigned to the application by a digital distribution platform (e.g., the APP STORE® digital distribution platform by Apple Inc. or the GOOGLE PLAY® digital distribution platform by Google, Inc.) that offers the application. In other implementations, the application search engine 200 assigns application IDs to each application when creating an application record 262 for the application.

The application features may include any type of data that may be associated with the application represented by the application record 262. The application features may include a variety of different types of metadata. For example, the application features may include structured, semi-structured, and/or unstructured data. The application features may include information that is extracted or inferred from documents retrieved from other data sources (e.g., application digital distribution platforms, application developers, blogs, and reviews of applications) or that is manually generated (e.g., entered by a human). The application features may be updated so that up to date results can be provided in response to a search query 110.

The application features may include the name of the developer of the application, a category (e.g., genre) of the application, a description of the application (e.g., a description provided by the developer), a version of the application, the operating system the application is configured for, and the price of the application. The application features further include feedback units provided to the application. Feedback units can include ratings provided by reviewers of the application (e.g., four out of five stars) and/or textual reviews (e.g., "This app is great"). The application features can also include application statistics. Application statistics may refer to numerical data related to the application. For example, application statistics may include, but are not limited to, a number of downloads, a download rate (e.g., downloads per month), and/or a number of feedback units (e.g., a number of ratings and/or a number of reviews). The application features may also include information retrieved from websites, such as comments associated with the application, articles associated with the application (e.g., wiki articles), or other information. The application features may also include digital media related to the application, such as images (e.g., icons associated with the application and/or screenshots of the application) or videos (e.g., a sample video of the application).

In some implementations, an application record 262 can group one or more application editions under a canonical application. The term canonical application can refer to a representative of a group of similar application editions. Put another way, the canonical application may be a representative or umbrella under which the one or more application editions are organized. Each application edition in a group of application editions that are organized under the same canonical application respectively indicate an application that is functionally similar to other application editions organized under the canonical application. In other words, the application editions can represent different versions of the same application (e.g., the canonical application). Examples of edition applications are different language versions of an application (e.g., English, Russian, or Chinese), different platform versions of an application (e.g., IOS® by Apple, Inc., or ANDROID® by Google Inc.), different functional characteristics (e.g., a light version, an advanced user version), and different resolution versions of an application (e.g., standard definition or high definition). It is noted that applications which are related but not similar, e.g., sequels in a series of games or a different release of a serial application, are typically not classified under the same canonical application. For example, ANGRY BIRDS®, by Rovio Entertainment Ltd. may be a separate canonical application from ANGRY BIRDS® RIO. Although the applications may have a same underlying concept, they are separate games.

The application search module 220 receives query wrappers 120 from remote user devices 100 and generates search results 130 based on the query wrapper 120 and the application data stored in the application datastore 260. FIG. 2B illustrates an example application search module 220. In the illustrated example, the application search module 220 includes a query analysis module 222, a set generation module 224, a set processing module 226, and an application spam detector 228.

The query analysis module 222 receives the search wrapper 120 that contains a search query 110. The query analysis module 222 may perform various analysis operations on the search query 110. For example, analysis operations performed by the query analysis module 222 may include, but are not limited to, tokenization of the search query 110, filtering of the search query 110, stemming the search query 110, synonomyzation of the search query 110, and stop word removal. In some implementations, the query analysis module 222 may further generate one or more reformulated search queries based on the search query 110 and the query parameters 115. Reformulated search queries are search queries that are based on some subcombination of the search query 110 and the query parameters 115.

The set generation module 224 identifies a consideration set 140 of applications (e.g., a list of applications) based on the search query 110 and, in some implementations, the reformulated subqueries. In some examples, the set generation module 224 may identify the consideration set 140 by identifying applications that correspond to the search query 110 or the reformulated search queries based on matches between terms of the query 110 and terms in the application data of the application (e.g., in the application record 262 of the application). For example, the set generation module 224 may identify one or more applications represented in the application datastore 260 based on matches between tokens generated by the query analysis module 222 and words included in the application records 262 of those applications. The consideration set 140 may include a list of application IDs and/or a list of application names.

The set processing module 226 performs a variety of different processing operations on the consideration set 140. In some implementations, the set processing module 226 may generate a result score for each of the applications indicated in the consideration set 140. In some examples, the set processing module 226 may cull the consideration set 140 based on the result scores of the applications contained therein. For example, the set processing module 226 may remove applications from the consideration set that have result scores that do not exceed a threshold. Additionally or alternatively, the set processing module 260 may rank the applications indicated in the consideration set 140 based on the respective result scores of each application. The information conveyed in the search results 130 may depend on how the result scores are calculated by the set processing module 226. For example, the result scores may indicate the relevance of an application to the search query 110, the popularity of an application in the marketplace, the quality of an application, or other properties of the application, depending on what parameters the set processing module 226 uses to score the applications.

The set processing module 226 may generate result scores for applications in a variety of different ways. In general, the set processing module 226 may generate a result score for an application based on one or more scoring features. The scoring features may be associated with the application and/or the query 110. An application scoring feature may include any data associated with an application. For example, application scoring features may include any of the application features included in the application record 262 or any additional parameters related to the application, such as data indicating the popularity of an application (e.g., number of downloads) and the ratings (e.g., number of stars) associated with an application. A query scoring feature may include any data associated with a query 110. For example, query scoring features may include, but are not limited to, a number of words in the query 110, the popularity of the query 110, and the expected frequency of the words in the query 110. An application-query scoring feature may include any data, which may be generated based on data associated with both the application and the query 110 (e.g., the query 110 that resulted in identification of the application record by the set generation module 224). For example, application-query scoring features may include, but are not limited to, parameters that indicate how well the terms of the query 110 match the terms of the identified application record 262. The set processing module 226 may generate a result score for an application based on at least one of the application scoring features, the query scoring features, and the application-query scoring features.

The set processing module 226 may determine a result score based on one or more of the scoring features listed herein and/or additional scoring features not explicitly listed. In some examples, the set processing module 226 may include one or more machine learned models (e.g., a supervised learning model) configured to receive one or more scoring features. The one or more machine learned models may generate result scores based on at least one of the application scoring features, the query scoring features, and the application-query scoring features. For example, the set processing module 226 may pair the query 110 with each application and calculate a vector of features for each (query 110, application) pair. The vector of features may include application scoring features, query scoring features, and application-query scoring features. The set processing module 226 may then input the vector of features into a machine-learned regression model to calculate a result score that may be used to rank the applications in the consideration set 140. The foregoing is an example of how a result score is calculated. Some implementations may calculate the result score in a different manner.

The application search engine 200 may use the result scores in a variety of different ways. In some examples, the application search engine 200 may use the result scores to rank the applications in the search results 130 that are presented on a user device 100. In these examples, a greater result score may indicate that the application is more relevant to the search query 110 and/or the query parameters 115 than an application having a lesser result score. In examples where the search results 130 are displayed as a list of application descriptions (e.g., an icon of an application and a description of the application) on a user device 100, the application descriptions associated with larger result scores may be listed nearer to the top of the results list (e.g., near to the top of the screen). In these examples, application descriptions having lesser result scores may be located farther down the list (e.g., off screen) and may be accessed by a user scrolling down the screen of the user device 100 or viewing a subsequent page of search results 130.

The application spam detector 228 analyzes the application data of the applications indicated in the consideration set 140 and identifies potential spam applications based on the analysis. The application spam detector 228 can consider the developer of an application and features of the developer when analyzing the application. In some examples, features of a developer can include, but are not limited to, the number of source objects published by the developer and the number of feedback units for each of the source objects. Once the application spam detector 228 identifies a potential spam application, the application spam detector 228 can apply a penalty to the potential spam application.

A source object can refer to instances of applications made available by the developer. For instance, if the developer sells the same application edition on two different digital distribution platforms, each instance of the application edition can be considered a source object. In other implementations, each application edition published by the developer is counted as a single source object regardless of how many application digital distribution platforms offer the application edition. The number of source objects also includes application editions organized under different canonical applications (i.e., applications that are not considered similar) but published by the developer. For example, if three different versions of a first application are offered on the GOOGLE PLAY® digital distribution platform and two different versions of a second application published by the developer of the first application are offered on the GOOGLE PLAY® digital distribution platform, then the application spam detector 228 counts five source objects. Furthermore, in implementations where applications are not organized as editions under canonical applications, the number of source objects can refer to the total number of application instances published by the developer, regardless of whether the applications are similar or not. Regardless of how the application spam detector 228 counts source objects, the manner by which the application spam detector 228 counts source objects must be consistent.

In some implementations, the application spam detector 228 analyzes the application data of each application indicated in the consideration set 140 to determine whether the application is a potential spam application. For each application, the application spam detector 228 can identify a developer of the application and then identify all source objects published by the developer. If the number of source objects attributed to the developer exceeds a source object threshold (e.g., more than 30 source objects), the application spam detector 228 can analyze the amount of feedback units provided for each application to determine whether the application is a potential spam application. In some implementations, the application spam detector 228 determines whether: i) a significant percentage of the source objects (e.g., more than 90% of the source objects) received less than a first threshold of feedback units (e.g., less than 10 feedback units); and ii) any of the source objects received more than a second threshold of feedback units (e.g., more than 300 feedback units). If a significant percentage of source objects received less feedback units than first threshold of feedback units and no source object received more feedback units than the second threshold of feedback units, then the application spam detector 228 identifies the application as a potential spam application. The values provided above are for example only. A significant percentage can refer to a percentage that exceeds a threshold. In the example discussed above, the threshold defining the significant percentage is 90%. The application spam detector 228 can utilize other suitable thresholds for defining the significant percentage.

When the application spam detector 228 identifies an application as a potential spam application, the application spam detector 228 applies a penalty to the potential spam application. A penalty can be any action that impacts how the application is represented in the search results 130. In some implementations, the penalty is removing the potential spam application from the search results 130. In other implementations, the application spam detector 228 penalizes the potential spam application by multiplying the result score of the application by a reduction factor (e.g., 0.05). This type of penalty may result in the application being removed from the search results 130 or being listed at the end of the search results 130 due to its lowered result score. The reduction factor can be hard coded by a developer or can be learned by a machine learner. In some implementations, the application spam detector 228 can further penalize the potential spam application by identifying the potential spam application and each of the source objects corresponding to the potential spam application as potential spam applications in their respective application data. In these implementations, the application spam detector 228 can update the application records 262 of the applications corresponding to each of the source objects (they are listed as applications in the application datastore 260) to indicate that the applications are potential spam applications.

In some implementations, the application spam detector 228 does not apply the penalty when the title of the potential spam application matches the search terms of the search query 110. In some of these implementations, the application spam detector 228 applies the penalty under this condition if there are one or more higher scoring applications that share a title with the potential spam application. In these implementations, the application spam detector 228 compares the title of the potential spam application with the search terms. In some implementations, the application spam detector 228 compares the title of the potential spam application and the search terms by determining whether the search terms and the title have matching name norms. A name norm can refer to the result of a function that converts a set of terms into a standardized representation. In some implementation, the application spam detector 228 implements an intelligent domain specific normalization function to determine the name norms of the search terms and the terms of the application title. The function can downcase the terms, remove punctuation, and/or remove any unnecessary words from the terms to obtain the name norms. If the name norms match, the application spam detector 228 reviews the consideration set 140 to determine whether there is another application indicated in the consideration set 140 that shares a title with the potential spam application and has a greater result score than the potential spam application. If the consideration set 140 lists an application that shares a title with the potential spam application and that has a higher result score than the potential spam application, the application spam detector 228 applies the penalty to the potential spam application. If the consideration set 140 does not list an application that shares a title with the potential spam application or if the potential spam application has a higher result score than any other application with which it shares a title, the application spam detector 228 does not apply the penalty to the potential spam application.

Once the application spam detector 228 has analyzed the applications listed in the consideration set 140, the results generation module 230 can generate the search results 130 and provide the search results 130 to the user device 100. In some implementations, the results generation module 230 provides the search results 130 to the user device 100 for display to a user. In these implementations, generating the search results 130 can include ranking the applications in the consideration set 140 based on their respective result scores and obtaining display items (e.g., application icon, application ratings, application reviews, and/or application descriptions) corresponding to each application in the consideration set 140. When ranking the applications in the consideration set 140, any penalties applied by the application spam detector 228 are taken into consideration by way of the result score (or alternatively, by the exclusion of the potential spam application from the consideration set 140). The results generation module 230 can include the display items in the search results 130 such that the user device 100 can display the search results 130 via its user interface. The results generation module 230 transmits the search results 130 to the user device 100 via the network 150. The user device 100 can render and display the search results 130. In other implementations, the results generation module 230 can provide the search results 130 to another component of the search engine 200 that performs additional searches. These additional searches may include a deep search. In these implementations, the results generation module 230 can rank the applications indicated in the consideration set 140 based on their respective result scores and can communicate the ranked consideration set 140 (or a subset of the consideration set 140 containing the highest ranked scores) to the subsequent search process.

The description of the application search engine 200 is provided for example only. The application spam detector 228 described above can be used in any other type of application search.

Figure 3:
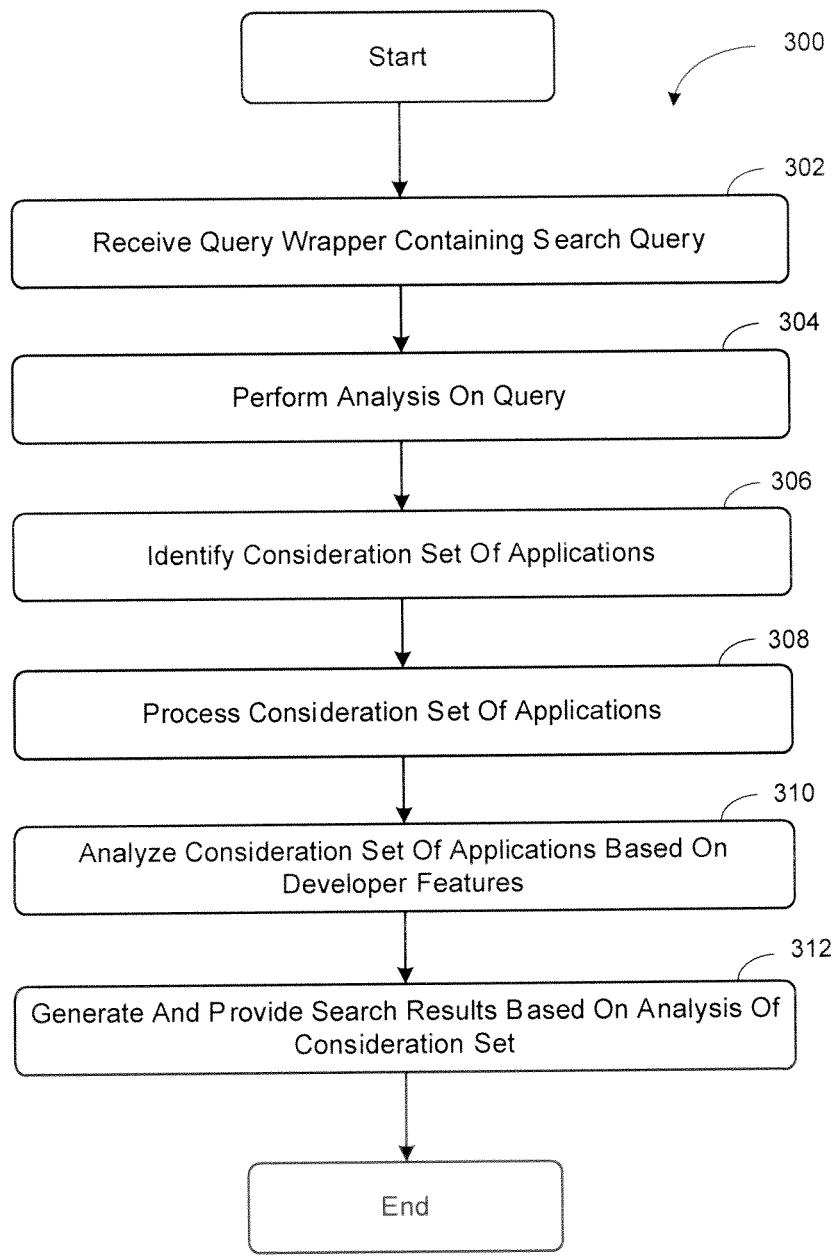
FIG. 3 is a flow chart illustrating an example set of operations for a method for performing an application search.

FIG. 3 illustrates an example set of operations for a method 300 for performing a search based on a received query wrapper 120. The method 300 is described with reference to the application search module 210 of FIG. 2. The method 300 may, however, be executed by any other suitable component.

In block 302, the query analysis module 222 receives a query wrapper 120 containing a search query 110. The query wrapper 120 may further include one or more query parameters 115 (e.g., location of the user device 100, platform of the user device 100, or a username). In block 304, the query analysis module 222 analyzes the query wrapper 120. The query analysis module 222 can reformulate the search query 110 to include one or more of the query parameters 115. Furthermore, in some implementations, the query analysis module 222 can generate a plurality of reformulated search queries based on the search query 110 and the query parameters 115. Reformulated search queries are sub-combinations of the search terms contained in the search query 110 and/or the query parameters 115. For instance, if the query wrapper 120 contained in the search query 110 is "find late night dining options," and the query parameters 115 included a location corresponding to Detroit, Mich., the reformulated search queries could include "late night dining," "late night dining Detroit," "dining Detroit," "dining," "late night," "late night Detroit Mich.," etc.

In block 306, the set generation module 224 identifies a consideration set 140 of applications based on the search query 110 (e.g., based on output from the query analysis module 222) and/or the reformulated search queries. In some implementations, the set generation module 224 identifies any application record 262 that contains the terms in the search query 110 and/or the reformulated search queries. If an application record 262 contains one or more of these terms, the application indicated by the application record 262 is included in the consideration set 140.

In block 308, the set processing module 226 processes the consideration set 140 of applications. In some implementations, the set processing module 226 may determine a result score for each of the applications in the consideration set 140. As previously discussed, the set processing module 226 can implement one or more machine learned models to score each application in the consideration set 140.

Figure 4:
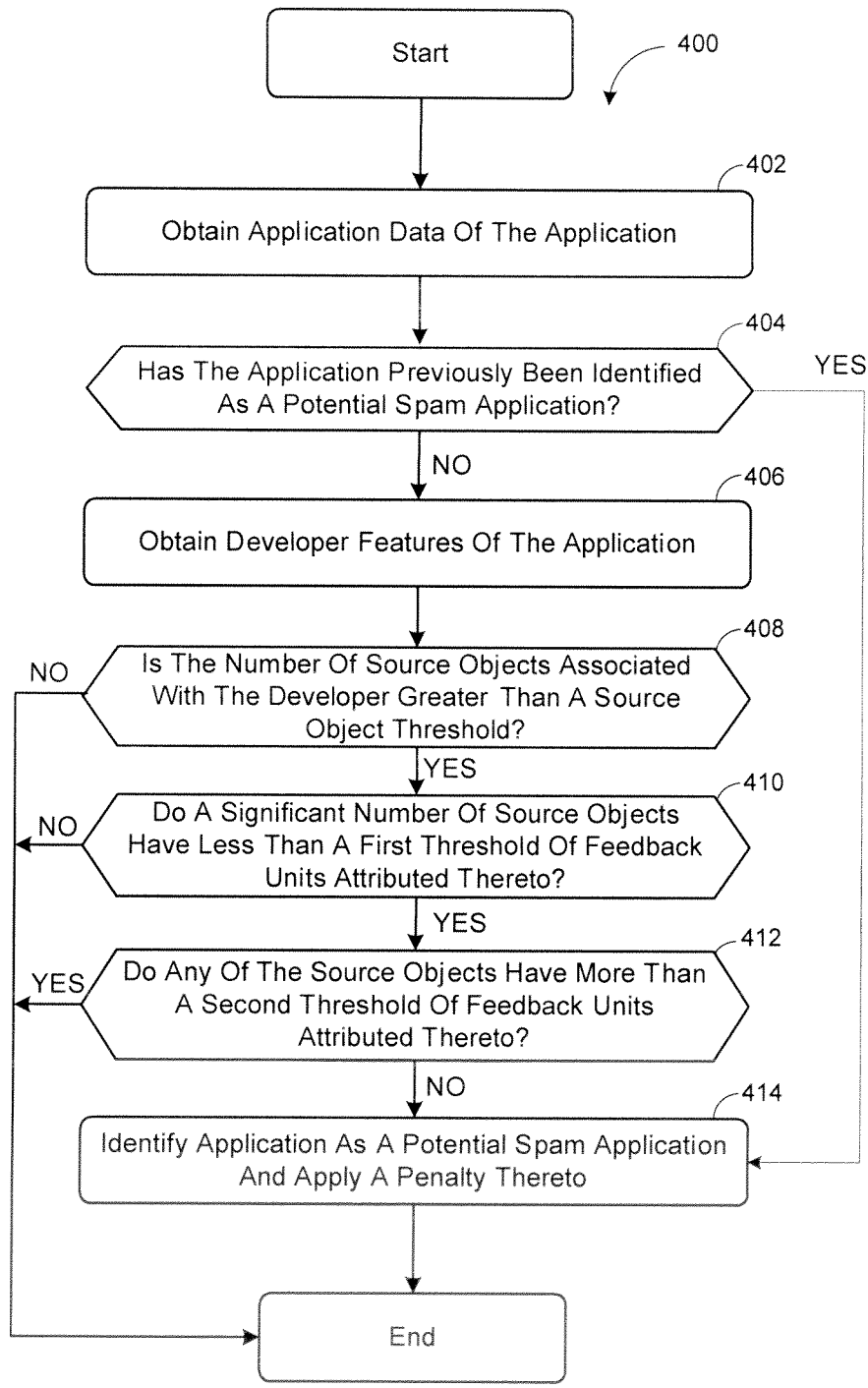
FIG. 4 is a flow chart illustrating an example set of operations for a method for analyzing a consideration set to identify potential spam applications.

In block 310, the application spam detector 228 analyzes the consideration set 140 to determine whether any of the applications included therein are potential application spam. FIG. 4 illustrates an example set of operations for a method 400 for determining whether an application is a potential spam application. The method 400 can be executed for each application in the consideration set 140.

At block 402, the application spam detector 228 obtains the application data of the application that it is analyzing. In some implementations, the application spam detector 228 obtains the application record 262 of the application. At block 404, the application spam detector 228 determines whether the application had been previously identified as a potential spam application. If so, the application spam detector 228 applies a penalty to the application spam detector 228, as shown at block 414. As previously discussed, the application spam detector 228 can either multiply the result score of the application by a reduction factor (e.g., 0.05 or 0.01) or can remove the application from the search results 130 altogether.

If the application has not been previously identified as a potential spam application, the application spam detector 228 obtains the features of the developer of the application, as shown at block 406. In some implementations, the application spam detector 228 identifies the application developer of the application from the application record 262. The application spam detector 228 searches the application datastore 262 for all other applications published by the developer and retrieves their respective application records 262. The application spam detector 228 can determine the number of source objects corresponding to the developer based on the information contained in the application records 262. The retrieved application records 262 also include the statistics of each application, including the number of feedback units that each application has received. In this way, the application spam detector 228 can identify the number of feedback units attributed to each of the source objects.

The application spam detector 228 determines whether the application under consideration is a potential spam application based on the features of the developer. At block 408, the application spam detector 228 determines whether the number of source objects attributed to the developer exceeds a source object threshold (e.g., more than 30 source objects). If the number of source objects is less than the source object threshold, the application is not identified as a potential spam application, and the application spam detector 228 can stop analyzing the application.

If the number of source objects does exceed the source object threshold, the application spam detector 228 determines whether a significant percentage of the source objects (e.g., more than 90% of the source objects) received less than a first threshold of feedback units (e.g., less than 10 ratings), as shown at block 410. If less than a significant percentage of source objects received fewer feedback units than the first threshold, the application is not identified as a potential spam application, and the application spam detector 228 can stop analyzing the application.

If a significant percentage of source objects received less feedback units than the first threshold, the application spam detector 228 can determine whether any one of the source objects received more feedback units than a second threshold (e.g., more than 300 ratings), as shown at block 420. If none of the source objects received more feedback units than the second threshold, the application is not identified as a potential spam application and the application spam detector 228 can stop analyzing the application. Otherwise, the application is identified as a potential spam application. When the application spam detector 228 identifies the application as a potential spam application, the application spam detector 228 can apply a penalty to the application, as shown at block 422.

The method 400 of FIG. 4 is provided for example only. The ordering of the blocks is not mandatory. Furthermore, the values of the thresholds are provided for example and not intended to limit the scope of the disclosure. Variations of the method 400 are contemplated and within the scope of the disclosure.

Referring back to FIG. 3, at block 312, the application search module 210 generates and provides the search results 130. In some implementations, the results generation module 230 generates search results 130 that it transmits to the user device 100 that provided the search wrapper 120. In these implementations, the results generation module 230 can rank the applications remaining in the consideration set 140 based on the result scores of the applications. The results generation module 230 also obtains display items (e.g., application name, icons, descriptions, screenshots) for each of the applications and formats the search results 130. The results generation module 230 can then transmit the search results 130 to the user device 100. In other implementations, the results generation module 230 provides the search results 130 to another search process. In these implementations, the results generation module 230 ranks the applications listed in the consideration set 140 and provides the search results 130 to the other search process (e.g., a deep search process).

The implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks 150 include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method for performing an application search, the method comprising:
   receiving, by a processing device, a search query from a remote device;
   determining, by the processing device, a consideration set of applications based on the search query, the consideration set indicating one or more applications corresponding to the search query;
   for each application indicated in the consideration set:
      determining, by the processing device, a number of source objects published by a developer of the application;
      for each source object, determining, by the processing device, a number of feedback units attributed to the source object;
      determining, by the processing device, whether the application is potential spam by:
         determining whether the number of source objects exceeds a source object threshold; and
         when the number of source objects exceeds the source object threshold, determining i) whether at least a minimum percentage of the source objects have less than a first threshold of feedback units attributed thereto, and ii) whether all of the source objects have less than a second threshold of feedback units attributed thereto, the second threshold of feedback units being greater than the first threshold of feedback units, wherein the application is identified as potential spam when at least the minimum percentage of the source objects have less than the first threshold of feedback units attributed thereto and all of the source objects have less than the second threshold of feedback units attributed thereto;
      when the application is determined to be potential spam, applying, by the processing device, a penalty to the application;
   generating, by the processing device, search results based on the consideration set and any penalties applied to the one or more applications indicated in the consideration set, the search results indicating one or more of the applications indicated in the consideration set; and
   providing, by the processing device, the search results.

2. The method of claim 1, wherein applying the penalty comprises removing the application from the consideration set, such that the consideration set no longer indicates the application.

3. The method of claim 1, further comprising determining a result score for each application indicated in the consideration set based on the search query and application data of the application.

4. The method of claim 3, wherein applying the penalty includes multiplying the result score of the application by a reduction factor.

5. The method of claim 4, wherein generating the search results comprises ranking the applications in the consideration set based on the respective result scores of the applications in the consideration set.

6. The method of claim 4, wherein applying the penalty includes:
   comparing a title of the potential spam application with the search query;
   when the title of the potential spam application does not match the search query, applying the penalty to the potential spam application; and
   when the title of the potential spam application does match the search query:
      determining whether another application in the consideration set has a title that matches the title of the potential spam application; and
      when another application in the consideration set has a title that matches the title of the potential spam application, only applying the penalty when the result score of the other application is greater than the result score of the potential spam application.

7. The method of claim 1, wherein providing the search results includes transmitting the search results to the remote device via a network.

8. The method of claim 1, wherein providing the search results includes feeding the search results to a subsequent search process.

9. A search engine for performing an application search, the search engine comprising:
a storage device;
a processing device that executes computer readable instructions, the computer readable instructions, when executed by the processing device, causing the processing device to:
receive a search query from a remote device;
determine a consideration set of applications based on the search query, the consideration set indicating one or more applications corresponding to the search query;
for each application indicated in the consideration set:
determine a number of source objects published by a developer of the application;
for each source object, determine a number of feedback units attributed to the source object;
determine whether the application is potential spam by:
determining whether the number of source objects exceeds a source object threshold; and
when the number of source objects exceeds the source object threshold, determining i) whether at least a minimum percentage of the source objects have less than a first threshold of feedback units attributed thereto, and ii) whether all of the source objects have less than a second threshold of feedback units attributed thereto, the second threshold being greater than the first threshold, wherein the application is identified as potential spam when at least the minimum percentage of the source objects have less than the first threshold of feedback units attributed thereto and all of the source objects have less than the second threshold of feedback units attributed thereto;
when the application is determined to be potential spam, apply a penalty to the application; and
generate search results based on the consideration set and any penalties applied to the one or more applications indicated in the consideration set, the search results indicating one or more of the applications indicated in the consideration set; and
provide the search results.

10. The search engine of claim 9, wherein applying the penalty comprises removing the application from the consideration set, such that the consideration set no longer indicates the application.

11. The search engine of claim 9, wherein the computer-readable instructions further cause the processing device to determine a result score for each application indicated in the consideration set based on the search query and application data of the application.

12. The search engine of claim 11, wherein applying the penalty includes multiplying the result score of the application by a reduction factor.

13. The search engine of claim 12, wherein generating the search results comprises ranking the applications in the consideration set based on the respective result scores of the applications in the consideration set.

14. The search engine of claim 11, wherein applying the penalty includes:
comparing a title of the potential spam application with the search query;
when the title of the potential spam application does not match the search query, applying the penalty to the potential spam application; and
when the title of the potential spam application does match the search query:
determining whether another application in the consideration set has a title that matches the title of the potential spam application; and
when another application in the consideration set has a title that matches the title of the potential spam application, only applying the penalty when the result score of the other application is greater than the result score of the potential spam application.

15. The search engine of claim 9, wherein providing the search results includes transmitting the search results to the remote device via a network.

16. The search engine of claim 9, wherein providing the search results includes feeding the search results to a subsequent search process.

* * * * *